(12) United States Patent
Rottinghaus

(10) Patent No.: US 9,126,258 B2
(45) Date of Patent: Sep. 8, 2015

(54) UNITARY CONNECTOR PIN FORMED BY TWO-STAGE COLD HEADING DIE

(71) Applicant: Robert Rottinghaus, Cedar Falls, IA (US)

(72) Inventor: Robert Rottinghaus, Cedar Falls, IA (US)

(*) Notice: Subject to any disclaimer, the term of this patent is extended or adjusted under 35 U.S.C. 154(b) by 253 days.

(21) Appl. No.: 13/780,331

(22) Filed: Feb. 28, 2013

(65) Prior Publication Data

US 2014/0241832 A1  Aug. 28, 2014

(51) Int. Cl.
| B21J 13/02 | (2006.01) |
|---|---|
| B21K 21/08 | (2006.01) |
| B21J 9/02 | (2006.01) |
| B21K 1/44 | (2006.01) |
| B21K 1/60 | (2006.01) |
| B25B 31/00 | (2006.01) |
| F16B 19/00 | (2006.01) |
| F16B 5/04 | (2006.01) |

(52) U.S. Cl.
CPC *B21J 13/02* (2013.01); *B21J 9/022* (2013.01); *B21K 1/44* (2013.01); *B21K 1/60* (2013.01); *B21K 21/08* (2013.01); *B25B 31/005* (2013.01); *F16B 19/004* (2013.01); *F16B 5/04* (2013.01)

(58) Field of Classification Search
CPC .............. B21J 9/02; B21J 9/022; B21J 9/027; B21J 9/14; B21J 13/02; B21J 13/025; B21K 1/44; B21K 1/60; B21K 21/08; B21K 21/12; B21K 27/00; B21K 27/04
USPC .............. 72/352, 353.2, 353.6, 354.2, 355.2, 72/357, 361, 404; 470/91, 95, 123, 137, 470/141
See application file for complete search history.

(56) References Cited

U.S. PATENT DOCUMENTS

| 3,261,196 A | * | 7/1966 | Bradlee et al. ............... 72/353.2 |
|---|---|---|---|
| 3,958,290 A | | 5/1976 | Lee |
| 4,018,132 A | | 4/1977 | Abe |
| 4,073,178 A | | 2/1978 | Dutartre et al. |
| 4,198,843 A | | 4/1980 | Spence |
| 4,232,812 A | | 11/1980 | Shibata |
| 4,237,566 A | | 12/1980 | Castiglioni |
| 4,335,507 A | | 6/1982 | Shibata |
| 4,362,042 A | | 12/1982 | Crow, Jr. |
| 4,449,428 A | | 5/1984 | Francis |

(Continued)

FOREIGN PATENT DOCUMENTS

GB  983070 A  *  2/1965  ............... B21K 1/60

*Primary Examiner* — Edward Tolan
(74) *Attorney, Agent, or Firm* — Greer, Burns & Crain, Ltd.

(57) ABSTRACT

A unitary metal connector pin formed by a cold heading die has a body with a disc-like expanded portion on a first end thereof which is adapted to engage and retain a first body when the pin is inserted through a first aperture in the first body. On a second, opposed end of the pin are disposed plural spaced flexible fingers each having a respective outwardly projecting, radially expanded portion. The radially expanded portions form a segmented outer ring on the pin capable of first undergoing inward deflection, followed by outward radial expansion for engaging a second body when the fingered end of the pin is inserted through a second aperture in the second body for securely coupling the two bodies together. The cold heading die includes a first stage for forming in a connector pin blank a first hollowed-out end portion with the flexible fingers and a second stage for forming the second radially expanded end portion and the outer projections on the flexible fingers.

18 Claims, 6 Drawing Sheets

(56) References Cited

U.S. PATENT DOCUMENTS

| | | | |
|---|---|---|---|
| 4,450,703 A | 5/1984 | McCloskey | |
| 4,510,781 A | 4/1985 | Holt | |
| 4,545,232 A * | 10/1985 | Martin et al. | 72/356 |
| 4,644,775 A * | 2/1987 | Fuchs, Jr. | 72/348 |
| 4,700,446 A | 10/1987 | Schmid et al. | |
| 5,186,688 A | 2/1993 | Uejima | |
| 5,195,477 A | 3/1993 | Hudson, Jr. et al. | |
| 5,205,146 A | 4/1993 | Wilkins et al. | |
| 5,308,286 A | 5/1994 | Uejima | |
| 5,493,833 A | 2/1996 | Irimies | |
| 5,606,887 A | 3/1997 | Spiegelberg et al. | |
| 5,664,902 A | 9/1997 | Holdsworth | |
| 5,909,980 A | 6/1999 | Holdsworth | |
| 6,202,282 B1 | 3/2001 | Holdsworth | |
| 6,248,276 B1 | 6/2001 | Parellada et al. | |
| 6,267,684 B1 | 7/2001 | Luhm | |
| 6,745,820 B2 | 6/2004 | Schivalocchi | |
| 6,878,069 B2 | 4/2005 | Swim, Jr. | |
| 7,021,516 B2 | 4/2006 | Smolinski et al. | |
| 7,047,617 B2 | 5/2006 | Ladouceur | |
| 7,104,109 B2 | 9/2006 | Wasilewski | |
| 7,108,607 B2 | 9/2006 | Swim, Jr. | |
| 7,175,533 B2 | 2/2007 | Franco et al. | |
| 7,374,494 B2 | 5/2008 | Brewer et al. | |
| 7,421,875 B2 | 9/2008 | Franco et al. | |
| 7,631,532 B2 | 12/2009 | Franco et al. | |
| 7,981,143 B2 | 7/2011 | Doubler et al. | |
| 8,070,888 B2 | 12/2011 | Torizuka et al. | |

* cited by examiner

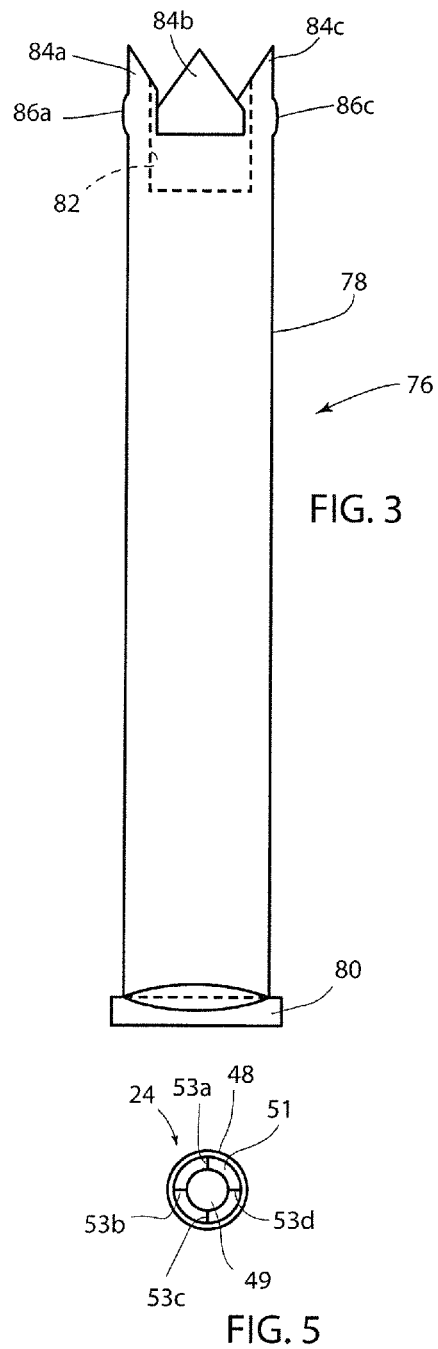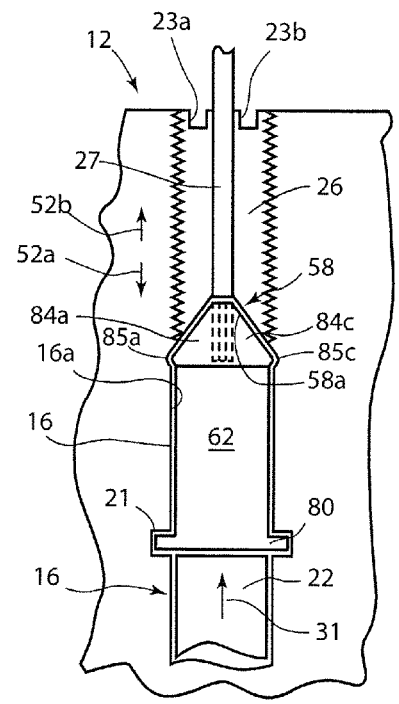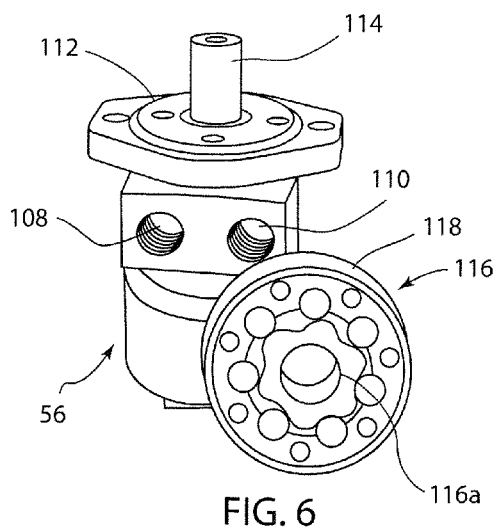

UNITARY CONNECTOR PIN FORMED BY TWO-STAGE COLD HEADING DIE

FIELD OF THE INVENTION

This invention relates generally to pin-like metal connectors for securely coupling two bodies together in a releasable manner, as well as to apparatus and a method for making this type of connector. More specifically, this invention is directed to a unitary connecting pin adapted for insertion through aligned apertures in first and second bodies to securely connect the two bodies together in a releasable manner, and is further directed to a two-stage cold heading die arrangement for making the inventive metal connecting pins.

BACKGROUND OF THE INVENTION

Push-type fasteners are commonly used to fasten together a pair of bodies, or parts, wherein the fastener is inserted through aligned apertures in the two bodies. This type of fastener typically includes a moveable expansion member which engages one of the bodies through which the connector is inserted by means of outward radial movement. The fastener also typically includes a second expanded member adapted for securely engaging the other body. These types of connectors typically involve a "push to latch" action for coupling the two bodies, and a "pull to unlatch" for disconnecting and separating the two bodies. The engaging element is typically in the form of a spherical ball which is biased outwardly such as by means of a spring to expand the radial dimension of the connector and prevent its withdrawal from the aligned apertures in the two connected bodies. These types of connectors also frequently include a control sleeve, or outer slider, adapted for linear displacement along the length of the connector for urging the outwardly biased ball inwardly and out of engagement with one of the connected bodies, permitting the pin to be withdrawn from the bodies which can then be separated. Examples of these types of push-pull connectors can be found in U.S. Pat. No. 5,562,375 to Jackson; U.S. Pat. No. 7,225,709 to Liao; and U.S. Pat. No. 6,206,432 to Kamiyama. The last patent contemplates forming the connector by deep drawing of a sheet metal.

The above described push-pull connectors are characterized as including various components, some of which are movable and thus require assembly, increasing the complexity and cost of the connector. The use of non-integral moving parts also increases the likelihood of component failure and limits the useful lifetime of the connector. In addition, contact between one moveable component with one or more other components limits the types of environments in which these types connectors are capable of extended use.

The present invention addresses these limitations of prior art push-pull types of connectors by providing a one piece, or unitary, connector pin comprised of a hard, durable metal and adapted for manufacture using a single cold heading die.

OBJECTS AND SUMMARY OF THE INVENTION

Accordingly, it is an object of the present invention to provide an improved push-pull type fastener which is easily attached to two thus connected bodies and is easily removed for disconnecting the bodies, is of unitary structure and does not require assembly of parts, is adapted for quick and inexpensive manufacture, and is comprised of high strength metal for secure coupling and long term, repetitive use.

A further object of the present invention is to provide a removable pin-like connector for securely coupling two bodies, parts or components, which includes only one component part and thus requires no assembly prior to use.

A still further object of the present invention is to produce pin-like metal connectors by means of a single, two-stage cold heading die for faster, less expensive, simpler and more reliable manufacture of the connectors.

Yet another object of the present invention is to provide for the manufacture of pin-like frictionally engageable connectors which are comprised of a single, unitary member, the manufacture of which simplifies and reduces the cost of fabrication by using a single cold heading die arrangement, provides for the attachment and detachment of the connecting pin via a single movement using one hand, and forms the individual pins by cutting off the end of metal wire provided to the cold heading die at a high speed feed rate.

The present invention contemplates a two-stage cold heading die for forming a unitary metal connecting pin, the cold heading die comprising a unitary die block having first, second and third linear cylindrical channels extending therethrough, wherein the first and second channels are in parallel, spaced alignment and the third channel intersects the first and second channels and is oriented generally orthogonal to the first and second channels; a first stage including intersecting portions of the first and third channels and adapted to receive and direct a pin blank into the first channel and a second stage adapted to receive the pin blank from the first stage and direct the pin blank into the second channel, the pin blank having a generally cylindrical shape and first and second opposed end portions; first displacement and forming means for engaging the pin blank in the first channel and forming a hollowed out first end portion and plural flexible fingers disposed about an outer periphery of the first end portion of said pin blank, and for positioning the pin blank in alignment with the third channel; displacement means disposed in the third channel and adapted to engage and move the pin blank from alignment with the first channel to alignment with the second channel; and second displacement and forming means disposed in the second channel for engaging the pin blank in said second channel and forming a disc-like, laterally extended base on the pin blank's second end portion, and further forming an outwardly extending upraised portion on each of the flexible fingers and bending distal ends of the fingers radially inwardly to form a tapered portion on the first end portion of the pin blank in forming a connecting pin; wherein the displacement means engages the formed connecting pin and displaces the connecting pin in the third channel to a discharge port in the cold heading die for discharge therefrom.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a perspective view of a cutting member used in the two-stage cold heading die illustrated in FIG. 1 for forming the individual connector pins by sequentially severing end portions of a metal wire provided to the two-stage cold heading die;

FIG. 3 is a lateral view shown partially in phantom of an inventive connector pin illustrated in a partially formed state which is produced by the two-stage cold heading die shown in FIG. 1;

FIG. 4 is a sectional view shown partially in phantom of a portion of the two-stage cold heading die illustrated in FIG. 1 for forming a tapered portion on one end of the connector pin shown in FIG. 3;

FIG. 5 is an end-on view of a die for use in the two-stage coldheading die in forming a recessed portion and plural spaced flexible fingers on the end of the connector pin shown in FIG. 3;

FIG. 6 is a perspective view of a rotary drive motor contemplated for use in providing metal wire to the two-stage cold heading die of the present invention;

DETAILED DESCRIPTION OF THE PREFERRED EMBODIMENTS

Figure 1:
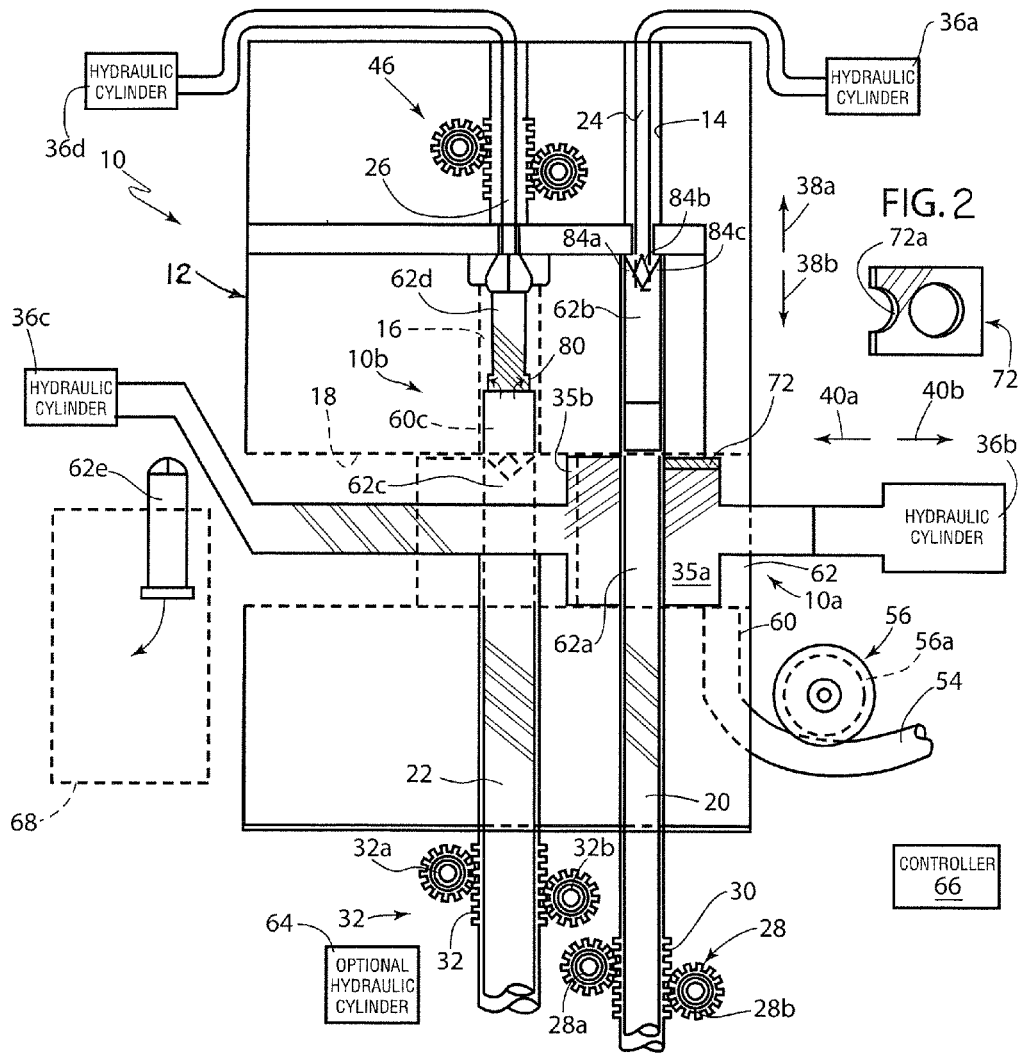
FIG. 1 is a simplified schematic diagram shown partially in phantom and partially in section of an inventive two-stage cold heading die in accordance with the present invention.

Referring to FIG. 1, there is shown in partially cutaway and dotted line form a two-stage cold heading die 10 in accordance with one aspect of the present invention. Cold heading die 10 includes a die block 12 comprised of a hard, high strength metal such as steel having a first stage 10a and a second stage 10b for forming a metal article such as a connector pin 76 as shown in partially assembled form in FIG. 3 and in final form in FIG. 4.

Connector pin 76 is comprised of a high strength metal such as of steel and includes an elongated, linear cylindrical body 78. On a first end of cylindrical body 78 is disposed a disc-like, laterally extended base 80. On a second, opposed end of the cylindrical body 78 there is formed, in a manner described in detail below, a cylindrical, hollowed-out end portion 82 shown in dotted line form in FIG. 3. Also disposed on the second end of cylindrical body 78 are plural, spaced peripheral fingers, where three of these peripheral fingers are identified as elements 84a, 84b and 84c. In the described embodiment, there are four equally spaced peripheral fingers disposed about the periphery of cylindrical body 78, although only three are shown in FIG. 2. Disposed at the base of each of the plural fingers 84a, 84b and 84c, as well as at the base of the fourth finger which is not shown in FIG. 3, is a respective peripheral annular extended portion, where the lower annular extended portions of fingers 84a and 84c are respectively identified in FIG. 2 as elements 86a and 86c. The outwardly extended portions of each of each of these fingers provide a segmented, outwardly extending ring adapted for engaging a first body (not shown), while the connector pin's laterally extended base 80 is adapted for engaging a second body (also not shown) for securely connecting the two bodies after the connector pin has been inserted through a pair of aligned apertures disposed in the two bodies.

Referring back to FIG. 1, the cold heading die's die block 12 includes first, second and third cylindrical slots 14, 16 and 18 extending therethrough. The first and second cylindrical slots 14, 16 are shown in FIG. 1 as extending vertically through the die block 12 and are parallel to one another. The third cylindrical slot 18 is shown extending horizontally through die block 12 as illustrated in FIG. 1. The third cylindrical slot 18 intercepts and extends through the first and second cylindrical slots 14, 16 and is aligned orthogonal, or at a right angle, to the first two cylindrical slots. The first and second cylindrical slots 14, 16 include respective upper portions 14a and 16a disposed above the third cylindrical slot 18 as shown in FIG. 1, and respective lower portions 14b and 16b disposed below the third cylindrical slot, with the respective upper and lower portions of the first cylindrical slots arranged in vertical alignment, and the upper and lower portions of the second cylindrical slot disposed in vertical alignment, again as shown in FIG. 1. Disposed within the lower portion 14b of the first cylindrical slot 14 in a sliding manner is a first cylindrical shaft 20. Similarly, disposed within the lower portion 16b of the second cylindrical slot 16 in a sliding manner is a second cylindrical shaft 22. Similarly, disposed in the upper portion 14a of the first cylindrical slot 14 and in the upper portion 16b of the second cylindrical slot 16 in a sliding manner are third and fourth cylindrical shafts 24 and 26, respectively. The upper and lower portions 14a, 16a and 14b, 16b of each of the first and second cylindrical slots 14, 16 extend to the respective upper and lower surfaces of the die block 12 providing access to all of the first through fourth cylindrical shafts 20, 22, 24 and 26 from outside of the die block. Thus, a lower end of the first cylindrical shaft 20 is coupled to a first rack and pinion arrangement 28 to allow for the extension and retraction of the first cylindrical shaft 20 within the first cylindrical slot 14 of die block 12. Similarly, a lower end of the second cylindrical shaft 22 is coupled to a second rack and pinion arrangement 32 for extending and retracting the second cylindrical shaft within the second cylindrical slot 16. The first rack and pinion arrangement 28 includes first and second toothed wheels 28a and 28b adapted to engage and displace a first toothed array 30 disposed on an outer surface of a lower end portion of the first cylindrical shaft 20. Similarly, the second rack and pinion arrangement 32 comprised of a pair of toothed wheels 32a and 32b engage a second toothed array 34 disposed on a lower, outer surface of the second cylindrical shaft 22. The second rack and pinion arrangement 32 allows for the extension and retraction of the second cylindrical shaft 22 within die block 12.

Coupled to an upper end of the third cylindrical shaft 24 as shown in FIG. 1 is a first dual-acting hydraulic cylinder 36a. The first hydraulic cylinder 36a provides for the extension and retraction of the third cylindrical shaft 24 within die block 12. The outer surface of fourth cylindrical shaft 26 is provided with a third toothed array 42 which is engaged by fifth and sixth toothed wheels 46a and 46b of a third rack and pinion arrangement 46. The third rack and pinion arrangement 46 allows for the extension and retraction of the fourth cylindrical shaft 26 within the upper portion 16a of the second cylindrical slot 16. It should be noted here that while the first, second and fourth cylindrical shafts 20, 22 and 26 are extended and retracted within die block 12 by means of a respective rack and pinion arrangement, while the third cylindrical shaft 24 is extended and retracted by means of a dual-acting hydraulic cylinder 36a, any of these cylindrical shafts could be driven by either a dual-acting hydraulic cylinder, a rack and pinion arrangement or an eccentric wheel drive arrangement (described below), as all of these reciprocating, linear drive arrangements are considered equivalent for use in the present invention.

Disposed within the third cylindrical slot 18 in a sliding manner are first and second displacement members 35a and 35b. First displacement member 35a is coupled to a second hydraulic cylinder 36b for linearly displacing rightward and leftward as shown in FIG. 1 the first displacement member within the third cylindrical slot 18 in die block 12. Similarly, the second displacement member 35b is coupled to a third hydraulic cylinder 36c for linearly displacing rightward and leftward the second displacement member within die block 12. Thus, when the second hydraulic cylinder 36b extends, the first displacement member 35a is extended further into the die block 12 in moving to the left as viewed in FIG. 1. Similarly, upon retraction of the second hydraulic cylinder 36b, the first displacement member 35a is moved to the right as viewed in FIG. 1. Similar extension and retraction of the third hydraulic cylinder 36c extends or retracts the second displacement member 35b in moving the second displacement member to the left or right within die block 12 as viewed in FIG. 1. In forming a connector pin in accordance with the present invention, the first, second, third and fourth cylindrical shafts 20, 22, 24 and 26 are displaced upwardly and downwardly and the first and second displacement members 35a and 35b are moved leftward and rightward in die block 12 as viewed in FIG. 1 by means of a controller 66 coupled to each of the above described hydraulic cylinders and rack and pinion arrangements. Controller 66 is a computer-based controller and may be of conventional design and operation, and is programmed to sequentially actuate the first, second and third hydraulic cylinders 36a, 36b and 36c and the first, second and third rack and pinion arrangements 28, 32 and 46 in a precisely controlled, sequential manner in forming a connector pin in accordance with the present invention as described in detail in the following paragraphs.

Figure 11:
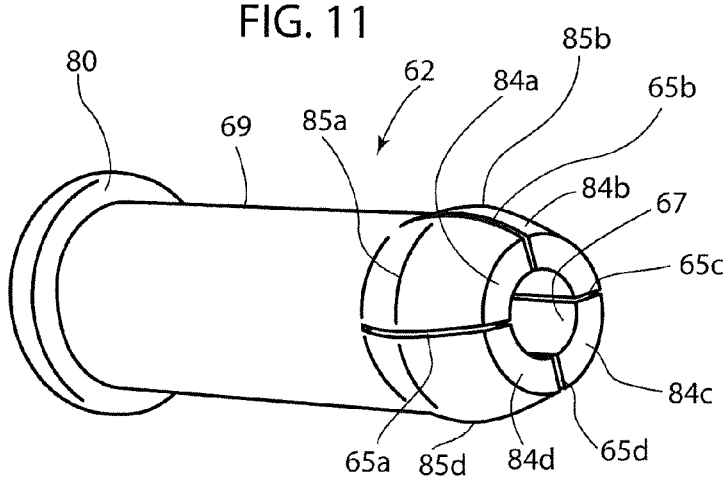
FIGS. 11 and 12 are respectively perspective and side elevation views of the inventive connector pin.
Figure 12:
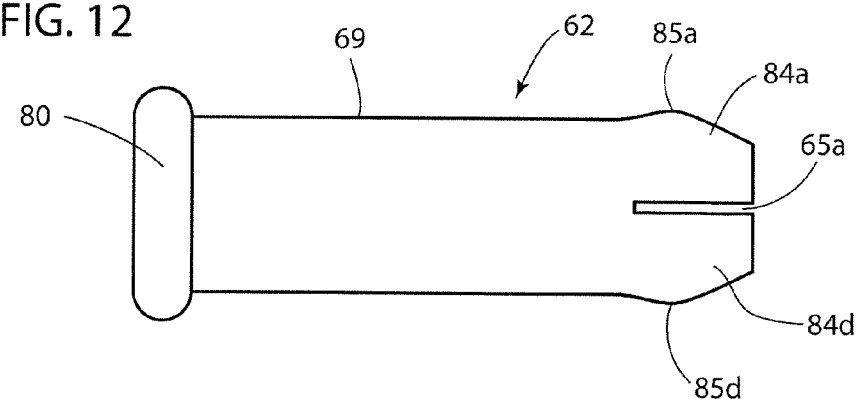
Figure 13:
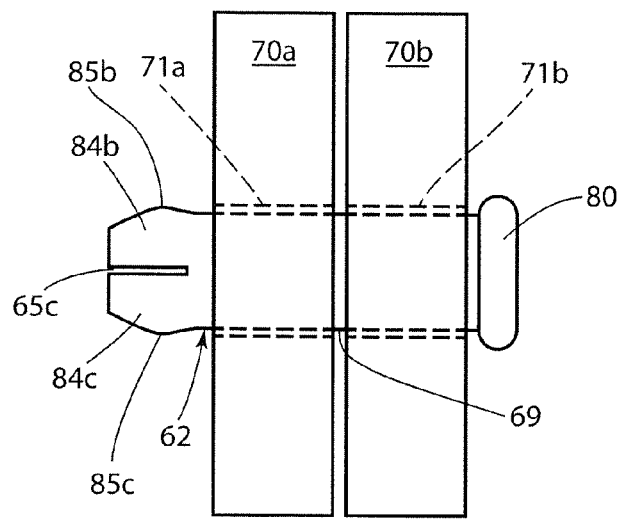
FIG. 13 is a side elevational view shown partially in view of the inventive connector pin inserted through and connecting a pair of bodies, or objects, in accordance with the present invention.

Referring to FIGS. 11 and 12, there are respectively shown perspective and side elevation views of a connector pin 62 in accordance with the present invention. Connector pin 62 includes a generally cylindrical, solid body 69 having a laterally extending base 80 on a first end thereof. Disposed on a second, opposed end of the cylindrical body 69 are plural, spaced, peripheral fingers 84a-84d. Disposed between adjacent fingers is a respective linear slot. Thus, linear slot 65a is disposed between adjacent fingers 84a and 84d, while linear slot 65b is disposed between adjacent fingers 84a and 84b. Similarly, linear slot 65c is disposed between adjacent fingers 84b and 84c, while linear slot 65d is disposed between adjacent flexible fingers 84c and 84d. The distal end of each of the flexible fingers 84a-84c is generally flat, and the flat distal ends of the four flexible fingers define a generally circular opening 67 disposed in the end of the connector pin 62 which facilitates inward flexure of the four flexible fingers when inserted through an aperture within the pair of bodies, or objects, 70a and 70b which the connector pin securely connects together as shown in FIG. 13. Disposed on respective outer portions of each of the four flexible fingers 84a-84d is a respective peripheral annular extended portion. Thus, the first, second, third and fourth peripheral fingers 84a-84d respectively include on an outer portion thereof first through fourth peripheral annular extended portions 85a-85d as shown in the figures. As shown in FIG. 13, connector pin 62 is adapted for insertion through aligned respective apertures 71a and 71b within the first and second bodies 70a and 70b. Before peripheral annular extended portions 85a-85c on the respective four plural, spaced, peripheral fingers 84a-84d are adapted for inward flexure when inserted through a respective aperture within one of the bodies 70a, 70b to facilitate insertion of the pin through these apertures. When fully inserted through the second body, or first body 70a as shown in FIG. 13, the four extended portions 85a-85d of the fingers radially expands outwardly so that the four fingers engage the first body 70a, while the laterally extended base 80 engages the second body 70b for securely maintaining the first and second bodies connected together. While four spaced, peripheral fingers 84a-84d are shown forming part of connector pin 62, the present invention is not limited to this number of peripheral flexible fingers, as the present invention may use virtually any number of flexible members on an end of the connector pin to securely engage one of the coupled bodies when the connector pin is inserted through both of the connected bodies.

Disposed within die block 12 is a fourth slot 60. The fourth slot 60 is adapted to receive the end of a metal wire 54. Engaging the metal wire 54 is a conventional rotary drive motor 56 which is illustrated in perspective view in FIG. 6. Rotary drive motor 56 is preferably a high torque, low speed hydraulic motor having a hydraulic fluid input port 108 and a hydraulic fluid output port 110. Rotary drive motor 106 further includes a generally flat upper platform 112 from which extends a rotating drive shaft 114. Rotary drive shaft 114 is adapted for insertion through a center aperture 116a within a rotating disc 116. With rotating drive shaft 114 inserted through the center aperture 116a of rotating disc 116, the disc is rotationally displaced at low speed and high torque. Disposed about the outer periphery of rotating disc 116 is an outer recessed channel 118 which is adapted to frictionally engage metal wire 54 and displace the metal wire into the fourth slot 60 within die block 12.

Under the influence of rotary drive motor 56, metal wire 54 is introduced into and displaced upward within the fourth slot 60 until the end of the wire engages an upper portion of third cylindrical slot 18 at location 18a. With the first and second displacement members 35a, 35b respectively moved by the second and third hydraulic cylinders 36b and 36c to the far right end of third cylindrical slot 18 with die block 12 as viewed in FIG. 1, the gap 44 between the first and second displacement members will be aligned with the upper end of the fourth slot 60 and will be adapted to receive the end of the metal wire 54. The combination of the first and second displacement members 35a, 35b is then moved leftward as viewed in FIG. 1 causing a cutting member 72 disposed on a lower end portion of the first displacement member to sever the metal wire 54 forming a metal wire section in the shape of a cylindrical pin 62a. As shown in FIG. 2, cutting member 72 includes a generally semi-circular cutting edge 72a for severing metal wire 54 and a generally circular aperture 72b for attaching it to first displacement member 35a. With the metal wire pin 62a disposed between the first and second displacement members 35a, 35b, leftward displacement of the displacement members as viewed in FIG. 1 will result in leftward displacement of the metal wire pin. Leftward movement of the displacement members 35a, 35b by the second and third hydraulic cylinders 35b, 35c places metal wire pin 62a in vertical alignment with the first cylindrical slot 14. Then, under the control of controller 66, the first rack and pinion arrangement 28 displaces the first cylindrical shaft 20 upward as viewed in FIG. 1 so as to raise the connector pin 62a to the position indicated by connector pin 62b within the upper portion 14a of the first cylindrical slot 14. Controller 66 then actuates first hydraulic cylinder 36a so as to displace in a downward direction as viewed in FIG. 1, the third cylindrical shaft 24 so that the lower end of the third cylindrical shaft engages the upper end of the connector pin 62b and applies sufficient pressure so as to form a cylindrical recess shown in FIG. 3 in dotted line form as element 82. During this process, the end of the third cylindrical shaft 24 forms four peripheral, spaced fingers on the upper end of connector pin 62b, three of which are shown as elements 84a, 84b and 84c in FIG. 3. In a preferred embodiment, four peripheral fingers are formed in the upper end of the connector pin 62b, although only three are shown in FIG. 3 for simplicity.

Referring to FIG. 5, there is shown an end-on view of the lower end of the third cylindrical shaft 24 which forms the spaced fingers and cylindrical recessed portion 82 within an end of the connector pin 62a. The lower end of the third cylindrical shaft 24 includes an outer peripheral circular wall 48 and an inner cylindrical die member 49 with an annular space 51 disposed between the outer circular wall and the inner cylindrical die member. Downward movement of the third cylindrical shaft 24 with its lower end engaging the upper end of connector pin 62a causes the cylindrical die member 49 to form the cylindrical, hollowed-out end portion 82. Four cutting blades 53a-53d form the four peripheral, spaced fingers about the outer periphery of the connector pin 62a.

Following the formation of the cylindrical, hollowed-out recessed end portion 82 and the plural fingers 84a-84d in the upper end of the connector pin 62, the first hydraulic cylinder 36a further extends, while the first cylindrical shaft 20 is lowered by means of the first rack and pinion arrangement 28 under the control of controller 66. The connector pin 62b is lowered within the upper portion 14a of the first cylindrical slot 14 until it is within the third cylindrical slot 18, whereupon controller 66 initiates extension of the second hydraulic cylinder 36b and retraction of the third hydraulic cylinder 36c so as to displace the first and second displacement members 35a, 35b leftward until connector pin 62b is aligned with the upper and lower portions 16a and 16b of the second cylindrical slot 16. Then, under the control of controller 66, the second cylindrical shaft 22 is raised by the second rack and pinion arrangement 32 so as to also raise the connector pin 62b within the upper portion 16a of the second cylindrical slot 16. The connector pin 62b is raised by the upward movement of the second cylindrical shaft 22 until it is immediately below a die member 58 connected to a support shaft 44 disposed within the upper portion 16a of the second cylindrical slot 16. Downward actuation of the third rack and pinion 46 by controller 66 causes the combination of support shaft 44 and die member 58 to move downward so that the die member engages the plural peripheral fingers disposed about the upper end portion of the connector pin 62b.

As shown in FIG. 4, contact between the lower tapered surface 58a of die member 58 with the upper peripheral fingers (only two fingers are shown as elements 84a and 84c for simplicity) of the connector pin 62b causes inward bending of the plural fingers to form a tapered end on the connector pin. In addition, further downward displacement of tapered die member 58 in contact with the pin connector's four flexible fingers 84a-84d results in the formation of radially expanded portions on the lower end of each of the four flexible fingers. Two of these radially expanded portions respectively disposed on lower end portions of flexible fingers 84a and 84c are shown as elements 85a and 85c in FIG. 4. Four spaced recesses are disposed within and about the inner circumference of the upper portion 16a of the second cylindrical slot 16 to accommodate formation of the expanded portions disposed on the inner end portions of the four flexible fingers 85a-85d. Simultaneously, upward pressure applied to the lower end of the connector pin 62b by means of the upper end of the second cylindrical shaft 22 causes an outward radial expansion of the lower end of the connector pin to form the pin's laterally extended base 80. An annular recess 21 disposed about the inner surface of the upper portion 16a of the second cylindrical slot 16 accommodates the formation of the connector pin's laterally extended base 80.

Figure 7:
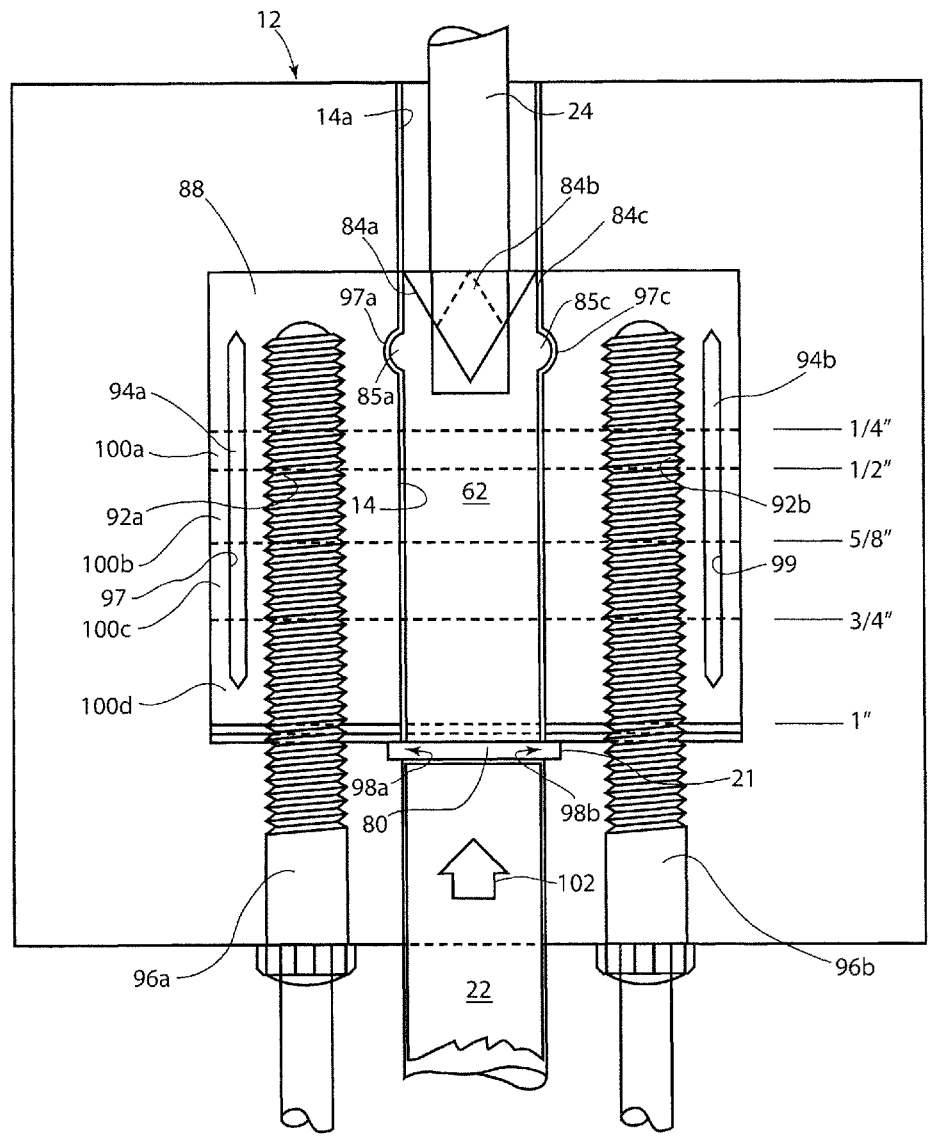
FIG. 7 is a side elevation view shown partially in phantom of an arrangement for fabricating inventive connector pins of various lengths in accordance with an aspect of the present invention.

Referring to FIG. 7, there is shown a sectional view of a portion of a modified die block 88 for use in the present invention in fabricating connector pins of various lengths. As in the previously described embodiment of die block 12, die block 88 shown in FIG. 7 includes an elongated cylindrical slot 14 corresponding to the first cylindrical slot in the embodiment illustrated in FIG. 1. Disposed within cylindrical slot 14 is the third cylindrical shaft 24 as in the previously described embodiment. Also included in die block 88 are plural outwardly extending recesses on the inner surface of the third cylindrical slot 24, where two are shown as elements 97a and 97c to accommodate radial, outward expansion of the plural, spaced peripheral fingers. Two of these outward expansions of flexible fingers 84a and 84c are identified as elements 97a and 97c in FIG. 7. Similarly, arrows 98a and 98b indicate the direction of metal flow in the formation of the laterally extended base 80 on the lower end of connector pin 62 as pressure is applied in the direction of arrow 102 on the connector pin by the second cylindrical shaft 22.

Die block 88 further includes plural die block inserts 100a-100d shown in a stacked array in FIG. 7. Each of the die block inserts 100a-100d includes a pair of aligned, threaded slots 92a and 92b respectively adapted to receive threaded connectors, or bolts, 96a and 96b. Threaded bolts 96a and 96b maintain the plural die block inserts 100a-100d in a secure, tight-fitting, stacked assembly as shown in the figure. Alignment of the threaded apertures in each of the stacked die block inserts 100a-100d is provided by means of a pair of alignment pins 94a and 94b respectfully inserted in corresponding alignment slots 97 and 99 in each of the die block inserts. By removing selected ones of the die block inserts 100a-100d, the length of the pin connector formed in the die block 88 may be precisely controlled. For example, the individual die block inserts 100a-100d may be sized so that the presence of all four die block inserts will provide a connector pin 1 inch in length. Removal of die block insert 100d will provide a connector pin ¾ inch in length. Removal of die block insert 100c will provide a connector pin ⅝ inch in length. Removal of die block insert 100b will produce a connector pin ½ inch in length. Removal of die block insert 100a will produce a connector pin ¼ inch in length. In this manner, by incorporating one or more of the die block inserts 100a-100d in die block 88, the length of the connector pin 62 formed within die block 88 may be easily selected and precisely controlled.

Figure 8A:
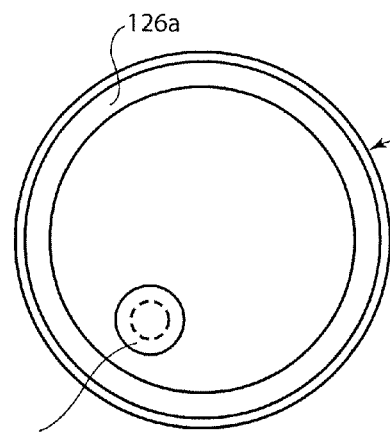
FIGS. 8a and 8b are side elevation views of first and second cam wheels used in the dual eccentric drive arrangement shown in FIG. 8.
Figure 8B:
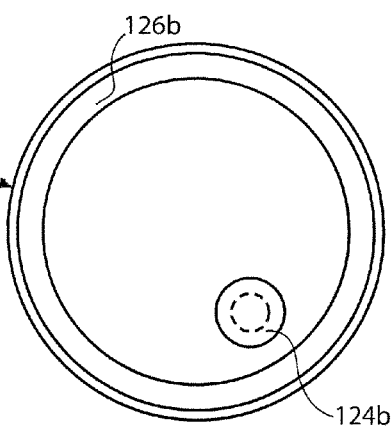
Figure 8:
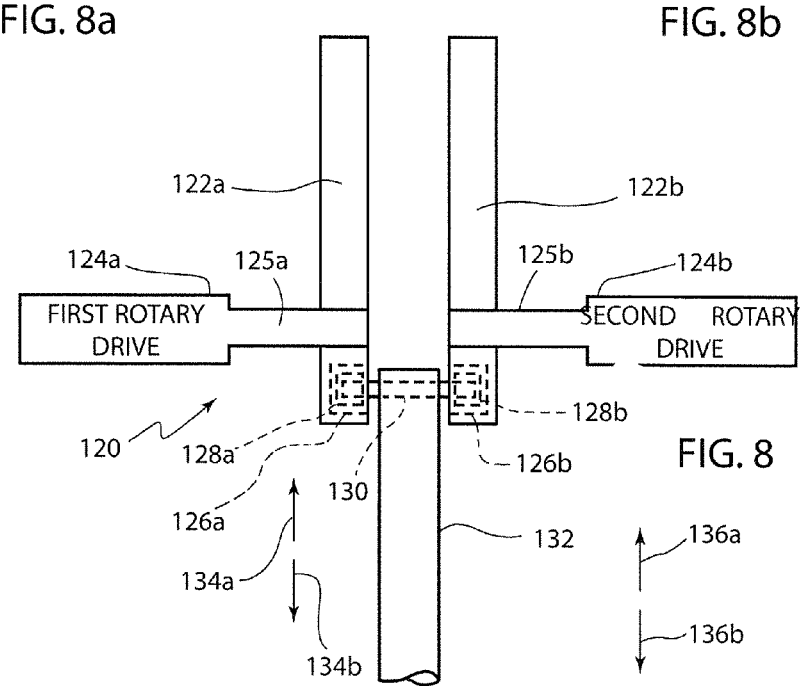
FIG. 8 is a simplified schematic end-on view of a dual eccentric drive arrangement for use in the inventive two-stage cold heading die shown in FIG. 1 in place of either hydraulic cylinders or rack and pinion arrangements in imparting reciprocating, linear motion to various components of the cold heading die.

Referring to FIG. 8, there is shown another arrangement as an alternative to a hydraulic cylinder or a rack and pinion combination for linearly displacing the various components in the two-stage cold heading die 10 of the present invention, such as the various shafts, displacement members and dies. The arrangement shown in the end-on view of FIG. 8 is an eccentric drive arrangement 120, or, more specifically, an elliptical drive arrangement. Eccentric drive arrangement 120 includes first and second aligned, closely spaced cam wheels 122a and 122b. Plan side views of the first and second cam wheels 122a, 122b are respectively shown in FIGS. 8a and 8b. A first rotary drive 124a is attached to the first cam wheel 122a by means of a first drive shaft 125a. Similarly, a second rotary drive 124b is coupled to the second cam wheel 122b by means of a second drive shaft 125b. The first and second drive shafts 125a and 125b are displaced in respective circles by means of the first and second circular drives 124a, 124b, respectively. Rotation of each of the first and second cam wheels 122a, 122b about a respective rotational axis define by its corresponding drive shaft 125a and 125b causes the first and second cam wheels, including their respective center axes, to trace out an elliptical path during rotation. Each of the first and second cam wheels 122a, 122b is coupled to a respective needle bearing 128a and 128b, with the pair of needle bearings, in turn, attached to opposed ends of a common bearing shaft 130. Each of the first and second cam wheels 122a, 12b includes a respective circular slot 126a and 126b disposed adjacent the cam wheel's outer peripheral surface, where the two peripheral slots are in facing relation with the two cam wheels positioned as shown in FIG. 8. Bearing shaft 130 is securely coupled to an end portion of an output shaft, or plunger, 132 as shown in FIG. 6. This allows the elliptical motion of the first and second cam wheels 122a, and 122b to be translated into reciprocating linear motion in the direction of arrows 136a and 136b where output shaft 132 is connected to any of the first through sixth cylindrical shafts 20, 22, 23, 24, 26 and 27 disposed within the die block 12 of the two-stage cold heading die 10 illustrated in FIG. 1. In the eccentric drive arrangement 120, the portion of the rotational stroke traveled by the first and second drive shafts 125a, 125b determines whether the output shaft 132 is moving in a reciprocating manner in the direction of arrow 134a or in the direction of arrow 134b.

Figure 9:
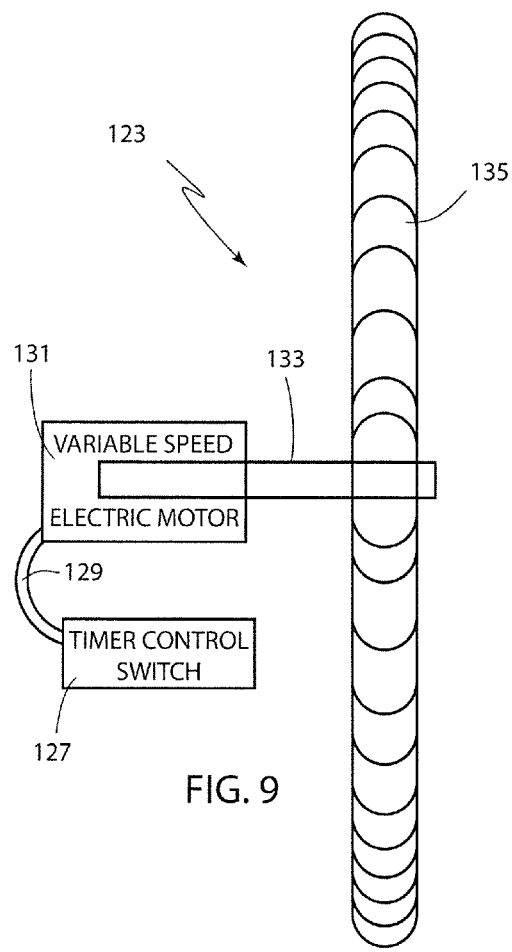
FIG. 9 is a simplified schematic diagram of yet another embodiment of a drive arrangement for reciprocating linear displacement of various moving parts in the inventive two stage cold heading die, where the length of the stroke may be easily changed to control various characteristics of the inventive connector pin including its length.
Figure 10:
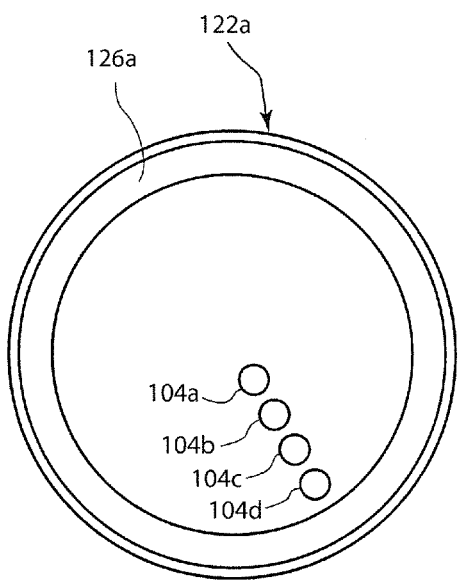
FIG. 10 is side elevation view of a cam wheel used in the variable displacement drive arrangement shown in FIG. 9.

Referring to FIG. 9, there is shown another arrangement as an alternative to the multi-insert die block 88 shown in FIG. 7 for controlling the length of the stroke of any of the first through fourth cylindrical shafts 20, 22, 24 and 26 for controlling the length of the connecting pin produced by the two-stage cold heading die 10 of the present invention. The arrangement shown in FIG. 9 is a variable speed drive 123 for supplying, or providing, wire 54 to the two-stage cold heading die 10. The variable speed drive arrangement 123 includes a variable speed electric motor 131 coupled to a reel of wire 135 by means of an input drive shaft 133. Variable speed electric motor 131 imparts rotation to input drive shaft 133 for rotationally displacing a wheel upon which the metal wire 135 is disposed. The speed of electric motor 131 is controlled by a timer control switch 127 which is coupled to the variable speed electric motor by means of an electric lead 129. The circular wheel 122a upon which the metal wire 135 is positioned includes an outer, peripheral grooved portion 126a within which is positioned the metal wire. Also disposed on an inner portion of wheel 122a are plural spaced apertures 104a-104d. The variable speed drive arrangement 123 allows input drive shaft 133 to be securely connected in a rotatable manner to any of the four drive shaft mounting apertures 104a-104d. Connecting the input drive shaft 133 to the outermost mounting aperture 104d provides the longest linear distance of travel of the metal wire 135 for providing a connector pin blank from the wire 135 of the greatest length for producing the longest connector pin, while attaching the input drive shaft 133 to the innermost drive shaft mounting aperture 104a will produce the shortest connector pin. In the manner, by selectively attaching input drive shaft 133 to one of the drive shaft mounting apertures 104a-104d within cam wheel 122a, the length of the connector pin may be selected as desired. Again, by connecting this variable length drive 123 to metal wire 54 fed into the die block 12 of the two-stage cold heading die 10, the length of the produced connector pin may be selected, as desired.

Having thus disclosed in detail several embodiments of the invention, persons skilled in the art will be able to modify certain of the structures shown and to substitute equivalent elements for those disclosed while continuing to practice the principles of the invention. It is, therefore, intended that all such modifications and substitutions be covered as they are embraced within the spirit and scope of the present invention as described in the claims.

What is claimed is:

1. A two-stage cold heading die for forming a unitary metal connecting pin, said cold heading die comprising:

a unitary die block having first, second and third linear cylindrical channels extending therethrough, wherein said first and second channels are in parallel, spaced alignment and said third channel intersects said first and second channels and is oriented generally orthogonal to said first and second channels;

a first stage including intersecting portions of said first and third channels and adapted to receive and direct a connector pin blank into said first channel and a second stage adapted to receive said connector pin blank from said first stage and direct said pin blank into said second channel, said connector pin blank having a generally cylindrical shape and first and second opposed end portions;

first displacement and forming means for engaging said connector pin blank in said first channel and forming a hollowed out first end portion and plural flexible fingers disposed about an outer periphery of the first end portion of said connector pin blank, and for positioning said connector pin blank in alignment with said third channel;

displacement means disposed in said third channel and adapted to engage and move said connector pin blank from alignment with said first channel to alignment with said second channel; and second displacement and forming means disposed in said second channel for engaging said connector pin blank in said second channel and forming a disc-like, laterally extended base on the connector pin blank's second end portion, and further forming an outwardly extending upraised portion on each of said flexible fingers and bending distal ends of said fingers radially inwardly to form a tapered portion on the first end portion of said connector pin blank in forming said connecting pin;

wherein said displacement means engages the formed connector pin and displaces said connector pin in said third channel to a discharge port in the cold heading die for discharge therefrom.

2. The cold heading die of claim 1 further comprising a cutting member attached to said displacement means for cutting a metal wire into connector pin blanks within said third channel, wherein said connector pin blanks are sequentially displaced by said displacement means into said first channel.

3. The cold heading die of claim 2, wherein said cutting member includes a concave, generally semi-circular cutting edge for engaging the metal wire.

4. The cold heading die of claim 2 further comprising a fourth cylindrical channel coupled to said third channel and adapted to receive and provide said metal wire to said third channel for severing of said metal wire in forming said connector pin blanks.

5. The cold heading die of claim 1, wherein said first displacement and forming means includes a first cylindrical die for forming the hollowed out first end portion of said connector pin blank, and a second cutting die for forming said plural flexible fingers about the first end portion of said connector pin blank.

6. The cold heading die of claim 5, wherein said first cylindrical die is disposed within and moves in a telescoping manner within and along the length of said second cutting die.

7. The cold heading die of claim 6, wherein said first displacement and forming means further includes a first linear displacement drive coupled to said first cylindrical drive and a second linear displacement drive coupled to said second cutting die.

8. The cold heading die of claim 7, wherein said first and second linear displacement drives each include a respective eccentric cam, hydraulic, pneumatic, or rack and pinion drive arrangement.

9. The cold heading die of claim 1, wherein said second displacement and forming means includes a second cylindrical die for forming said disc-like laterally extended base on the connector pin blank's second end portion and a third bending die for engaging and bending said flexible fingers inwardly to form a tapered portion on the connector pin blank's first end portion and said upraised portions on each of said flexible fingers.

10. The cold heading die of claim 9, wherein said second cylindrical and third bending dies are disposed in said second channel adjacent said second and first opposed ends of said connector pin blank, respectively.

11. The cold heading die of claim 10, wherein said third bending die first bends said flexible fingers inwardly followed by formation of said upraised portions on each of said flexible fingers.

12. The cold heading die of claim 11, further comprising a fourth cylindrical die inserted into the connector pin blank's hollowed out first end portion prior to inward bending of said flexible fingers to form a gap between the ends of the bent-in fingers to facilitate inward bending of the flexible fingers during use.

13. The cold heading die of claim 1 further comprising one or more die inserts adapted for insertion in the cold heading die for selectively increasing the thickness of the cold heading die and the length of the connector pins formed by the cold heading die.

14. The cold heading die of claim 13 further comprising first and second sets of plural aligned apertures in the cold heading die and in said one or more of said die inserts, and first plural alignment pins inserted through each of said first set of apertures for arranging the cold heading die inserts in common alignment and second plural coupling pins inserted through each of said second set of plural aligned apertures for securely coupling the cold heading die inserts together in a stacked array.

15. The cold heading die of claim 14, wherein said second set of plural aligned apertures include an inner threaded portion and said coupling pins are in the form of threaded bolts or screws.

16. The cold heading die of claim 1, wherein said first and second displacement and forming means are selectively adjustable for forming metal connector pins of various lengths.

17. The cold heading die of claim 16, wherein each of said first and second displacement and forming means includes in combination plural dies and plural linear drivers, wherein each linear driver is coupled to an associated die and said linear drivers are adjustable in displacement length to accommodate the forming of metal connector pins of various lengths.

18. The cold heading die of claim 17, wherein said linear drivers each include an eccentric, a hydraulic, a pneumatic, or a rack and pinion drive arrangement.

\* \* \* \* \*